(12) United States Patent
Zhong et al.

(10) Patent No.: US 11,302,105 B2
(45) Date of Patent: Apr. 12, 2022

(54) GRID MAP OBSTACLE DETECTION METHOD FUSING PROBABILITY AND HEIGHT INFORMATION

(71) Applicant: DALIAN UNIVERSITY OF TECHNOLOGY, Liaoning (CN)

(72) Inventors: Wei Zhong, Liaoning (CN); Shenglun Chen, Liaoning (CN); Haojie Li, Liaoning (CN); Zhihui Wang, Liaoning (CN); Risheng Liu, Liaoning (CN); Xin Fan, Liaoning (CN); Zhongxuan Luo, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 17/280,745

(22) PCT Filed: Mar. 5, 2020

(86) PCT No.: PCT/CN2020/077975
§ 371 (c)(1),
(2) Date: Mar. 26, 2021

(87) PCT Pub. No.: WO2021/098082
PCT Pub. Date: May 27, 2021

(65) Prior Publication Data
US 2021/0312197 A1 Oct. 7, 2021

(30) Foreign Application Priority Data
Nov. 21, 2019 (CN) .......................... 201911145461.7

(51) Int. Cl.
*G06V 20/58* (2022.01)
*G06T 7/77* (2017.01)
*G06K 9/62* (2022.01)

(52) U.S. Cl.
CPC .......... *G06V 20/58* (2022.01); *G06K 9/6223* (2013.01); *G06K 9/6278* (2013.01); *G06T 7/77* (2017.01)

(58) Field of Classification Search
CPC ............... G05D 1/0088; G05D 1/0274; G06K 9/00791; G06K 9/6223
See application file for complete search history.

(56) References Cited

U.S. PATENT DOCUMENTS

2015/0012209 A1* 1/2015 Park ..................... G05D 1/0231
701/408
2019/0353791 A1* 11/2019 Vignard ................. G06V 20/58

FOREIGN PATENT DOCUMENTS

| CN | 107064955 A | 8/2017 |
| CN | 108764108 A | 11/2018 |
| KR | 20190043035 A | 4/2019 |

OTHER PUBLICATIONS

Duan Jianmin; "Grip Map Updating and Obstacle Detection Based on Improved Bayesian Interference;" Laser Journal (vol. 38, No. 8, 2017); (p. 6).

(Continued)

*Primary Examiner* — Vincent Rudolph
*Assistant Examiner* — Raphael Schwartz
(74) *Attorney, Agent, or Firm* — Muncy, Geissler, Olds & Lowe, P.C.

(57) ABSTRACT

The present invention discloses a grid map obstacle detection method fusing probability and height information, and belongs to the field of image processing and computer vision. A high-performance computing platform is constructed by using a GPU, and a high-performance solving algorithm is constructed to obtain obstacle information in a map. The system is easy to construct, the program is simple, and is easy to implement. The positions of obstacles are (Continued)

acquired in a multi-layer grid map by fusing probability and height information, so the robustness is high and the precision is high.

2 Claims, 2 Drawing Sheets

(56) References Cited

OTHER PUBLICATIONS

Zhou Jun-jing; "Moving Object Detecetion For Intelligent Vehivles Based On Occupancy Grid Map;" System Engineering and Electronics, (vol. 37, No. 2, Feb. 2015); (p. 7).
Office Action corresponding to Chinese application No. 201911145461.7 dated Jun. 9, 2020 (p. 9).
Notification of Grant corresponding to Chinese application No. 201911145461.7 dated Aug. 18, 2020. (p. 2).

* cited by examiner

GRID MAP OBSTACLE DETECTION METHOD FUSING PROBABILITY AND HEIGHT INFORMATION

TECHNICAL FIELD

The present invention belongs to the field of image processing and computer vision. After using a ranging sensor to create a grid map of a scenario, the positions of obstacles are acquired in a multi-layer grid map by fusing probability and height information.

BACKGROUND

In recent years, with the development of artificial intelligence, people pay more and more attention to mobile robots and autonomous vehicles, and one of the main problems to be solved is obstacle detection. A grid map is one of the most common maps in unmanned navigation, so how to use the grid map to complete obstacle detection has become a very important problem. The obstacle detection method using a grid map mainly uses the Bayesian inference algorithm and the classic Dempster combination rule in the evidence theory framework, and such method is applied to probabilistic grid maps. However, since the probabilistic grid map is a two-dimensional map, an obstacle detected therein only has plane information. If there is a need to complete more accurate obstacle detection, the detection is required to be performed in a three-dimensional space. In a grid map model, there is a grid map that contains height information about obstacles, which is called an elevation map. How to fuse two information to obtain accurate information has become a research difficulty. The present invention proposes an obstacle detection method which uses a probabilistic grid map and an elevation map to complete obstacle detection in a three-dimensional space and fuses the probabilistic grid map and the elevation map in an algorithm. Compared with the traditional algorithm, this algorithm fusing probability and height information has the advantage that the positions of obstacles can be detected more accurately.

SUMMARY

The present invention provides a grid map obstacle detection method fusing probability and height information. As a representation for a space, a grid map represents current scenario information on a certain plane in the space. In order to illustrate the specific algorithm, there are the following settings in the present invention: setting that there is a spatial rectangular coordinate system XYZ, the X axis is horizontal to the right, the Y axis is upright, and the Z axis is forward; and setting that the grid map is created on the XOZ plane, and XOZ reflects the current horizontal plane. P represents a probabilistic grid map, and H represents an elevation map.

The specific technical solution of present invention comprises the following steps:

1) Bayesian Inference

A grid in a P map contains probabilistic information about whether it is occupied, i.e. the grid state. In the case where the existing state of the grid and the grid state of this measurement are known, obtaining the grid state after this measurement by Bayesian inference, and if the probability of the grid is greater than $P_{min}$, restoring virtual points of the grid using an H map.

2) Restoring Three-Dimensional Boundary

The H map includes height information about the grid, namely a Y coordinate. Calculating the X and Z coordinates of the grid according to the position where the grid is located. Restoring all highest points C of the grid according to the H map, wherein because these points may not exist in actual measurement, they are called virtual points in the algorithm, and the virtual points describe the upper boundary in the scenario. If the probability corresponding to the grid is less than $P_{min}$ or the Y coordinate is less than $h_{min}$, not restoring.

3) Clustering Virtual Points 3-1) Selecting Initial Values

Performing clustering on the virtual points, for example, KMeans clustering. Selecting initial values of KMeans in the form of space division, and sampling using a sliding window. First, dividing the current field of view into f parts, f being an integer other than 0, sampling in each part, if the number $N_w$ of grids with virtual points in the sliding window is greater than $N_{min}$, selecting the virtual points of the grid with the maximum probability in the sliding window as alternative initial values $C_i$. Then, merging the alternative initial values, and setting the initial values $C_i$ and $C_j$ between which the weighted distance is within $d_1$ to the same category k. If the probability of some virtual points $C_k^m$ in the category is obviously greater than that of other points $C_k^n$, that is, $P_k^m > P_k^n + \varepsilon$, $\varepsilon$ being a constant less than 1 and greater than 0, using $C_k^m$ to calculate a category center $C_k$, otherwise, using all points. When calculating the category center, taking the probability of the virtual points as the weight, the category center being the weighted mean of the selected virtual points, the probability of the category center being the mean probability of the virtual points participating calculation. Stopping after K centers are selected.

3-2) Clustering and Extracting Bounding Boxes

After selecting the initial values of K, clustering all virtual points, and when calculating the distance to a clustering center, weighting the distance using the probability of the clustering center. When updating the clustering center, calculating the weighted mean of all samples in the category as a new clustering center, the probability of the center being the mean probability of the virtual points in the category. Extracting bounding boxes of all categories after clustering.

3-3) Merging Categories

After clustering, over-categorization may occur, so a merging operation is required. If the difference between probabilities of centers of two categories does not exceed $p_1$ and the weighed distance is less than $d_2$, merging the two categories; and if the distance between the bounding boxes of the two categories in one of the X and Z directions is less than $d_3$, merging the two categories.

3-4) Correcting Bounding Boxes

After merging, there may be two situations where the bounding boxes are overlapped and the bounding boxes are separated. If the bounding boxes are overlapped, traversing the bounding boxes and eliminating overlapping regions; and if the bounding boxes are separated, checking the bounding boxes around empty regions, incorporating if the sum of increase of a bounding box in the X and Z directions does not exceed T when an empty region is incorporated into the bounding box, otherwise, creating a new bounding box around the empty regions, the new bounding box being called a fuzzy obstacle because the probability value is very low.

$P_{min}$, $h_{min}$, $N_{min}$, $d_1$, $d_2$, $d_3$, $p_1$ and T in the algorithm are set thresholds.

The present invention has the following beneficial effects:

The present invention designs a grid map obstacle detection method fusing probability and height information, which uses the Bayesian inference and clustering algorithm to fuse probabilistic and height information to detect obstacles in a space, and completes obstacle selection in combination with the rigorous screening and merging processes. The present invention has the following characteristics of:

1. simple program and easy implementation;
2. high efficiency of algorithm and good timeliness; and
3. high reliability of multi-input fusion detection.

DETAILED DESCRIPTION

Figure 1:
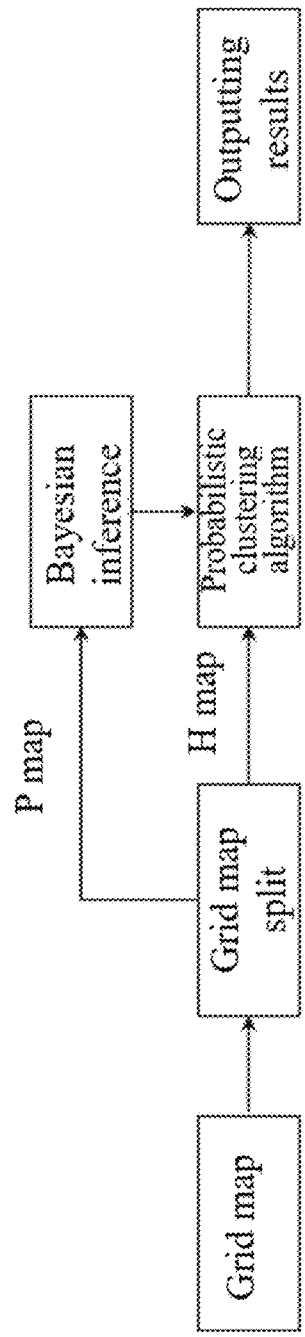
FIG. 1 shows the overall flow of the algorithm.
Figure 3:
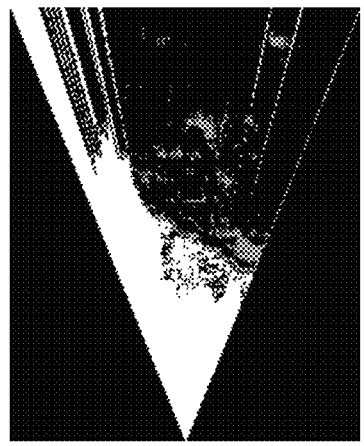
FIG. 3 shows the input grid map.

The present invention proposes a grid map obstacle detection method fusing probability and height information, which is described in detail with reference to the accompanying drawings and embodiments as follows:

The overall flow is shown in FIG. 1. First, inputting a grid map, FIG. 3 representing a simulation map of the input grid map, which may be divided into two parts: a probabilistic grid map (P map) and an elevation grid map (H map). Then, updating the grid state using the P map in combination with Bayesian inference, and completing obstacle clustering detection using the H map and the updated result. Finally, outputting results.

Figure 2:
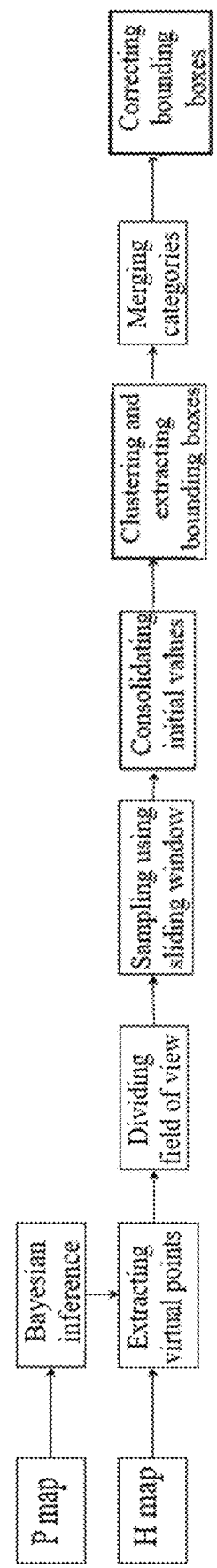
FIG. 2 shows the detailed flow of clustering inference.

In order to illustrate that the specific algorithm, there are the following settings in the present invention: setting that there is a spatial rectangular coordinate system XYZ, the X axis is horizontal to the right, the Y axis is upright, and the Z axis is forward; and setting that the grid map is created on the XOZ plane, and XOZ reflects the current horizontal plane. P represents a probabilistic grid map, and H represents an elevation grid map. On this basis, the grid map obstacle detection method is described. As shown in FIG. 2, the method comprises the following steps:

1) Bayesian Inference

As shown in FIG. 2, only the P map enters the Bayesian inference stage. Bayesian inference refers to combining the grid state at time t−1 with the grid state measured at current time t, to obtain the measured grid state. In Bayesian inference, there is a need to obtain the posterior probability $p(m|z_{1:t})$ of each grid, where $p(m)$ represents the probability of map initialization, and $p(z_{1:t})$ represents the probability from 1 to time t, the form of log-odds ratio is applied to Bayesian inference, so a time recursion form may be formed, and the local map probability value at the time t is finally calculated as $$p(m \mid z_{1:t}) = 1 - \frac{1}{1+\exp\{l_t\}}, \text{ where } l_t = \log\frac{p(m \mid z_{1:t})}{1 - p(m \mid z_{1:t})}.$$

If the probability of the grid is greater than $P_{min}$, restoring virtual points of the grid using an H map.

2) Extracting Virtual Points, Restoring Three-Dimensional Boundary

As shown in FIG. 2, the H map and the updated grid state are jointly used to extract virtual points. The H map includes height information about the grid, namely a Y coordinate. Calculating the X and Z coordinates of the grid according to the position where the grid is located. Restoring the highest points of the grid according to the H map, which are called virtual point in the algorithm, the virtual points describing the upper boundary in the scenario. If the probability corresponding to the grid is less than $P_{min}$ or the Y coordinate is less than $h_{min}$, not restoring.

3) Clustering Virtual Points 3-1) Dividing Field of View, Selecting Initial Values Using Sliding Window First, dividing the current field of view into f parts, and then, sampling in each part using a sliding window. Setting the sliding window to W and the size of the window to a×b. If the number $N_w$ of grids with virtual points in the sliding window is greater than $N_{min}$, selecting the virtual points of the grid with the maximum probability in the sliding window as alternative initial values $C_i$, the probability value being $P_i$.

3-2) Consolidating Initial Values

As shown in FIG. 2, after using the obtained alternative initial values, entering the stage of consolidating the initial values. If there is a weighted distance between the alternative initial values $C_i$ and $C_j$, and the weight value is probability, setting the two to the same category k within $d_1$; if the probability of some virtual points $C_k^m$ in the category k is obviously greater than that of other points $C_k^n$, that is, $P_k^m > P_k^n + \varepsilon$, $\varepsilon$ being a constant less than 1 and greater than 0, using the points with higher probability to calculate a category center $C_k$, otherwise, using all points. Taking the probability of the virtual points as the weight, the category center $C_k$ being the weighted mean $$\frac{1}{\sum P_i} \sum P_i C_i$$

of the selected virtual points, the probability $P_k$ of the center being $$\frac{1}{n} \sum P_i.$$

Stopping after K centers are selected.

3-3) Clustering and Extracting Bounding Boxes

Figure 4A:
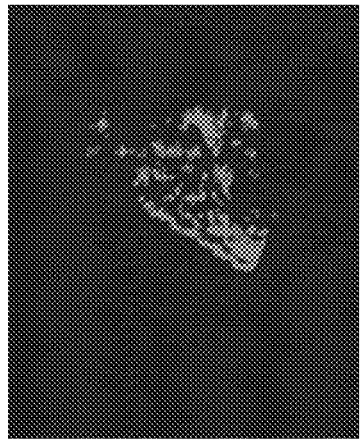
FIG. 4($a$) shows clustering result, and FIG. 4($b$) shows merged result.

Entering the clustering stage after selecting the initial values, using the KMeans clustering algorithm for all virtual points, calculating the weighted distance $P_k |C_i - C_k|_p$ from all virtual points to the clustering center $C_k$ in the clustering process, $\|\cdot\|_p$ being a p norm, if the weighted distance from a certain virtual point to any clustering center exceeds $d_{max}$, eliminating the virtual point. When updating the clustering center, calculating the weighted mean of all samples in the category as a new clustering center, the clustering center being the probability mean of all virtual points in the category. Extracting bounding boxes of all categories after clustering, the bounding boxes being described respectively by 7 values: clustering center $C_k$, probability $P_k$, maximum Y coordinate $Y_{max}$, maximum and minimum grid serial numbers in the X direction $X_{max}$ and $X_{min}$, and maximum and minimum grid serial numbers in the Z direction $Z_{max}$ and $Z_{min}$; visualizing the bounding boxes on the XOZ plane. FIG. 4($a$) shows the expected effect in this stage.

As shown in FIG. 2, the last two stages of the clustering algorithm are secondary aggregation stages, including merging categories and correcting bounding boxes.

3-4) Merging Categories

After KMeans clustering, quite close categories may occur, so a merging operation is required at this time. If the weighted distance between probabilities $P_i$ and $P_j$ of centers $C_i$ and $C_j$ of two categories is less than $d_2$, merging the two categories, and if the distance between the bounding boxes of the two categories in one of the X and Z directions is less than $d_3$, merging the two categories.

3-5) Correcting Bounding Boxes

Figure 4B:
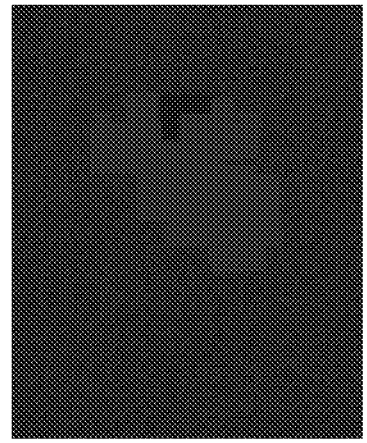

After merging, there may be two situations where the bounding boxes are overlapped and the bounding boxes are separated. If the bounding boxes are overlapped, traversing the bounding boxes and eliminating overlapping regions; and if the bounding boxes are separated, checking the bounding boxes around empty regions, incorporating if the sum of increase of a bounding box in the X and Z directions does not exceed T when an empty region is incorporated into the bounding box, otherwise, checking empty regions adjacent to the empty region, if the number of empty regions that cannot be incorporated exceeds num, creating a new bounding box around these empty regions, the bounding box being described by 5 values: center $B_i$, maximum and minimum grid serial numbers in the X direction $X_{max}$ and $X_{min}$, and maximum and minimum grid serial numbers in the Z direction $Z_{max}$ and $Z_{min}$, the new bounding box being called a fuzzy obstacle because the probability value of the empty region is extremely low. Such box is used to mark regions, as shown in FIG. 4(b).

$P_{min}$, $h_{min}$, $N_{min}$, $d_1$, $d_2$, $d_3$, $p_1$, T and num in the algorithm are set thresholds.

The invention claimed is:

1. A grid map obstacle detection method fusing probability and height information, comprising the following steps:
    1) in the case where a previous grid state of a grid and a current grid state are known, obtaining a measured grid state measured in real time by a sensor based on the previous grid state and the current grid state by Bayesian inference, and when a probability $P_i$ of the grid determined by the Bayesian inference is greater than $P_{min}$, restoring virtual points of the grid using an H map;
    2) calculating X and Z coordinates of the grid according to the position where the grid is located; restoring highest points of the grid according to the H map, which are called virtual points; extracting virtual points and restoring three-dimensional boundaries; and when the probability of the grid is less than $P_{min}$, or the Y coordinate is less than $h_{min}$, not restoring the virtual point;
    3-1) dividing the current field of view of the sensor into f parts, and then, sampling in each part using a sliding window; selecting initial values using the sliding window, setting the sliding window and the size of the window to a×b; when a threshold condition is met, selecting the virtual points of the grid with the maximum probability in the sliding window as alternative initial values $C_i$, the probability value being $P_i$;
    3-2) when there is a weighted distance between the initial values $C_i$ and other initial values $C_j$, and the weighted distance is the probability of the grid, setting the initial values $C_i$ and $C_j$ to the same category k when the weighted distance is within a threshold $d_1$; when the probability of some virtual points $C_k^m$ in the category k is greater than that of other points $C_k^n$, that is, $P_k^m > P_k^n + \varepsilon$, $\varepsilon$ being a constant less than 1 and greater than 0, using the points $C_k$ with higher probability to calculate a category center, otherwise, using all points; taking the probability of the virtual points as the weight, the category center $C_k$ being the weighted mean $$\frac{1}{\sum P_i} \sum P_i C_i$$

of the selected virtual points, the center probability $P_k$ being $$\frac{1}{n} \sum P_i;$$

stopping after K centers are selected;
    3-3) using the KMeans clustering algorithm for all virtual points, calculating the weighted distance $P_k |C_i - C_k|_p$ from all virtual points to the clustering center $C_k$ in the clustering process, $\|_p$ being a p norm, when the weighted distance from the clustering center $C_k$ exceeds $d_{max}$, eliminating the virtual point; when updating the clustering center, calculate the weighted mean of all samples in the category as a new clustering center, the clustering center being the probability weighted mean of virtual points in the category; extracting bounding boxes of all categories after clustering, the bounding boxes being described respectively by 7 values: clustering center $C_k$, probability $P_k$, maximum Y coordinate $Y_{max}$, maximum and minimum grid serial numbers in the X direction $X_{max}$ and $X_{min}$, and maximum and minimum grid serial numbers in the Z direction $Z_{max}$ and $Z_{min}$;
    3-4) when the weighted distance between probabilities $P_i$ and $P_j$ of centers $C_i$ and $C_j$ of two categories is less than $d_2$, merging the two categories, and when the distance between the bounding boxes of the two categories in one of the X and Z directions is less than $d_3$, merging the two categories;
    3-5) after merging, when the bounding boxes are overlapped, traversing the bounding boxes and eliminating overlapping regions; and when the bounding boxes are separated, checking the bounding boxes around empty regions, incorporating the bounding boxes into one bounding box when the sum of increase of a bounding box in the X and Z directions does not exceed T when an empty region is incorporated into the bounding box, otherwise, checking other empty regions which are adjacent to the empty region, when the number of empty regions that cannot be incorporated exceeds num, creating a new bounding box around these empty regions, the bounding box being described by 5 values: center $B_i$, maximum and minimum grid serial numbers in the X direction $X_{max}$ and $X_{min}$, and maximum and minimum grid serial numbers in the Z direction $Z_{max}$ and $Z_{min}$.

2. The grid map obstacle detection method fusing probability and height information according to claim 1, wherein $P_{min}$, $h_{min}$, $N_{min}$, $d_1$, $d_2$, $d_3$, $p_1$, T and num in the method are set thresholds.

* * * * *